(12) United States Patent
Doyle et al.

(10) Patent No.: US 6,350,297 B1
(45) Date of Patent: Feb. 26, 2002

(54) GAS SEPARATION DEVICES

(75) Inventors: Mark Laurence Doyle, Herts; Neil Edwards, Reading, both of (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 09/194,377

(22) PCT Filed: May 30, 1997

(86) PCT No.: PCT/GB97/01477

§ 371 Date: Sep. 1, 1999

§ 102(e) Date: Sep. 1, 1999

(87) PCT Pub. No.: WO97/46482

PCT Pub. Date: Dec. 11, 1997

(30) Foreign Application Priority Data

Jun. 1, 1996 (GB) .............................................. 9611491

(51) Int. Cl.$^7$ ..................... B01D 53/22; B01D 59/12; B01D 59/14; H01M 8/06; H01M 8/18
(52) U.S. Cl. .................. 95/55; 95/56; 96/4; 96/11; 429/12; 429/19; 429/20
(58) Field of Search ................ 95/55–56; 96/4–11; 429/19–20, 12

(56) References Cited

U.S. PATENT DOCUMENTS 4,795,536 A * 1/1989 Young et al. ............... 204/129
5,393,325 A * 2/1995 Edlund ......................... 95/56
5,780,179 A * 7/1998 Okamoto ..................... 429/20
5,904,913 A * 5/1999 Bohm et al. ............. 423/648.1

FOREIGN PATENT DOCUMENTS

| EP | 434 562 A1 | 6/1991 |
| EP | 434 562 B1 | 6/1991 |
| EP | 570 185 A2 | 11/1993 |

OTHER PUBLICATIONS

UK Search Report dated Aug. 27, 1996; GB 9611491.3.

* cited by examiner

Primary Examiner—Mark F. Huff
Assistant Examiner—Daborah Chacko-Davis
(74) Attorney, Agent, or Firm—Ratner & Prestia

(57) ABSTRACT

A gas separation device for the removal of carbon oxides from a hydrogen-rich gas stream in the form of a composite comprising a hydrogen diffusion membrane and a methanation catalyst. The hydrogen diffusion membrane may be applied to the upstream surface of a porous or microporous support and the methanation catalyst may be applied to the downstream surface of the porous or microporous support. The gas separation device is particularly useful for negating pinhole leakages of carbon monoxide through palladium alloy membrane by virtue of the polishing-up action of the methanation catalyst

17 Claims, No Drawings

GAS SEPARATION DEVICES

This application is the U.S. national-phase application of PCT International Application No. PCT/GB97/01477.

This invention relates to improvements in gas separation devices, particularly hydrogen diffusion membranes.

Hydrogen is one of the most important industrial gases. It is used, for example, in ammonia synthesis, methanol synthesis, fuel cells, chemical hydrogenations, gas chromatography, semiconductor processing, metal manufacture, glass processing and also as a cooling medium in power stations. In most of these applications, the hydrogen has to be virtually 100% pure.

In recent years, synthetic permeable membranes have been developed which can be used for hydrogen separation and purification. A purification technique which is based on the selective diffusion of hydrogen through bundles of fine silver/palladium alloy tubes has been employed for some years. However, this technique has not been universally accepted as a gas clean-up device due to its extremely high cost, high operating pressure and relatively low throughput. Improvements have been made in recent years where a silver/palladium alloy is deposited on a ceramic substrate. This allows layers of metal to be made much thinner, thereby reducing cost and giving a higher specific throughput at a given operating pressure. Other membranes which have been developed for hydrogen separation and purification include ceramic membranes, zeolite membranes and polymer membranes.

Palladium-based membranes are useful for a number of industrial and analytical applications. One such application is the processing of reformate gas streams to produce pure hydrogen for use in fuel cells. This hydrogen purification process has the advantage of being a single stage process which is compatible with reformate gas streams and operates at temperatures and pressures coincident with the normal reforming/cracking conditions (ie methanol, methane and other hydrocarbons). The palladium alloy may be deposited on the porous support at desirable thicknesses using a variety of methods, of which sputtering, chemical vapour deposition, physical vapour deposition and electroless plating are examples.

Although supported palladium alloy membranes of the above type, with very high specific flow rates, have been manufactured with some degree of success, the coating of a porous ceramic support with an essentially non-porous thin alloy film represents special problems. Small defects in the support lead to pin-holes in the palladium alloy membrane which compromise the maximum hydrogen purity which such composites can attain. Furthermore, the very important application of hydrogen processing for fuel cells requires hydrogen with a very low carbon monoxide content (typically less than 100 ppm for low-temperature phosphoric acid fuel cells and less than 10 ppm for proton exchange membrane fuel cells). This gas quality is close to the current state of the art for supported palladium alloy membranes and for such a critical application an additional degree of security is required. There is currently a high failure rate in the production of totally leak-free supported palladium alloy membranes and if a leak develops during use of such a membrane in a fuel cell system, the increased level of carbon monoxide can have an immediate poisoning effect on the fuel cell anode catalyst.

European Patent No 0434562 B1 relates to a process and apparatus for the purification of hydrogen gas streams used for hydrogenations in refinery and petrochemical plants. The carbon monoxide in such purified hydrogen gas streams needs to be less than 50 ppm. In this purification process, the hydrogen stream to be purified is firstly applied to a gas diffusion membrane capable of preferentially allowing hydrogen to pass through and at the same time preferentially blocking other components of the gas stream such as carbon monoxide and hydrogen sulphide. Most of the carbon monoxide in the original hydrogen stream is removed by the membrane but a small amount of carbon monoxide passes through the membrane. The permeate gas stream is then subjected to a subsequent and separate stage of methanation wherein the carbon monoxide content is lowered to the required level. The process and apparatus described in the aforementioned European Patent is intended for large scale industrial operation at high pressures and high flow rates. Feed gas pressures of 40 to 120 bars, pressure drops of 30 to 80 bars and flow rates of 12,700 $Nm^3$/hr (ie over 200,000 liters/min) are mentioned. Moreover, because of the large volume of hydrogen involved, the two-step purification process (gas diffusion and methanation) is suitably conducted in several stages. Also, the gas diffusion and methanation steps are conducted at different temperatures.

The present invention provides an improved process and apparatus for the purification of hydrogen gas streams by a combination of gas diffusion membrane and methanation.

The present invention also provides a gas separation device which overcomes the problems of current gas diffusion membranes by preventing leakage of carbon oxides through the membrane.

According to the present invention there is provided a gas separation device in the form of a composite comprising a hydrogen diffusion membrane and a methanation catalyst for the removal of carbon oxides from hydrogen gas streams.

Suitably, the hydrogen diffusion membrane is associated with the upstream surface of a porous or microporous support and the methanation catalyst is associated with the downstream surface of the porous or microporous support.

Preferred support materials include alumina and alumino silicates.

Suitable hydrogen diffusion membranes include palladium alloy membranes, ceramic membranes, zeolite membranes and polymer membranes. Examples of ceramic membranes are a porous glass membrane marketed under the trade mark "Vycor" which does not require a ceramic support and a metal oxide membrane marketed under the trade mark "Velterop". Examples of polymer membranes are polyimides and polysulfone membranes marketed under the trade mark "Prism".

Preferred palladium alloy membranes are palladium alloyed with one or more metals selected from Ag, Au, Pt, Cu, B, In, Pb, Sn and rare earths.

The palladium alloy membrane is preferably from 1 to 10 microns thick.

In the gas separation device of the present invention the methanation catalyst preferably is a selective methanation catalyst for the removal of carbon monoxide and/or carbon dioxide from a hydrogen gas stream.

Suitable methanation catalysts are those based on iron, cobalt, nickel, ruthenium, rhodium, palladium, osmium, iridium or platinum.

In the case of carbon monoxide removal from reformate gas mixtures, particularly for fuel cell applications, the methanation catalyst suitably should be capable of reducing carbon monoxide in the permeate gas stream to a concentration below 100 ppm, preferably below 10 ppm.

A further aspect of the invention provides a process for the purification of a hydrogen gas stream using the gas separation device as claimed herein.

Suitably, the hydrogen gas stream to be purified is a reformate gas mixture.

Preferably, the hydrogen gas stream is fed to the gas separation device at a pressure less than 30 atmospheres.

Further preferably, the pressure drop of the hydrogen gas stream over the gas separation device is less than 15 atmospheres.

Suitably, the flow rate of the hydrogen gas stream fed to the gas separation device is less than 10,000 liter/min.

Suitably, the hydrogen diffusion membrane and the methanation catalyst function within the same temperature window.

Suitably, also the hydrogen gas stream is purified in a single pass through the gas separation device.

The present invention is also a fuel cell system for vehicular application comprising (a) an on-board hydrogen supply unit; (b) a hydrogen purification unit and (c) a fuel cell wherein the hydrogen purification unit comprises a gas separation device as claimed herein and operates by the process claimed herein.

Suitably, the fuel cell is a proton exchange membrane fuel cell or a low-temperature phosphoric acid fuel cell.

Embodiments of the invention will now be described by way of example only.

EXAMPLE 1
Sample Construction

A hydrogen diffusion membrane was prepared by applying a 7.5 micron Pd-Ag film on the outside of a porous alumino-silicate ceramic tube (7 cm long and 1.55 cm diameter) by the technique of electroless plating. A 2.6% Rh/alumina methanation catalyst supported on a ceramic monolith (cordierite) was inserted into the ceramic tube.

The catalyst was prepared by applying rhodium nitrate solution (containing 67 mg Rh) to an alumina washcoat located on a 39 mm length of monolith segment, which had been shaped to fit the ceramic tube. The monolith segment was calcined in air at 500° C., reduced with aqueous $NaBH_4$ solution, and dried, before being cemented inside the ceramic tube.

Measurements

The membrane/methanation catalyst composite was sealed into a module using graphite rings giving an effective area (of exposed membrane) of 24 $cm^2$. A synthetic reformate (containing 70% $H_2$, 28% $CO_2$ and 2% CO) was applied at pressure (3 atm) and elevated temperature (440° C.) to the outside of the membrane, and the resulting flow of gas through the membrane/methanation catalyst composite was measured. The composition of the permeated gas stream was analysed by gas chromatography.

The module was then subjected to a thermal cycle that is known to degrade the membrane and reduce its resistance to permeation by CO and $CO_2$. The thermal cycle consisted of cooling the module to room temperature and re-heating to 440° C., with 0.5 bar differential pressure of neat hydrogen across the membrane. The synthetic reformate was then applied again to the membrane/methanation catalyst composite (as above).

Results

The rate of gas permeation through the fresh membrane/methanation catalyst composite was 600 $cm^3$ $min^{-1}$. Apart from hydrogen, the exit gas contained 156 ppm $CH_4$, 2 ppm CO and 81 ppm $CO_2$ As $CH_4$ was absent from the synthetic reformate, its presence in the exit stream indicated that the methanation catalyst was active in the removal of carbon oxides that were permeating through the membrane.

After the thermal cycle, the gas permeation rate was still the same, but the CH4 concentration in the exit stream was slightly higher (162 ppm); the CO and $CO_2$ concentrations were 2 and 22 ppm respectively.

EXAMPLE 2
Sample Construction

The membrane/methanation catalyst composite was prepared as in Example 1, except that the rhodium methanation catalyst was supported directly on the inside of the alumino-silicate ceramic tube supporting the membrane. The catalyst was applied by treating the inside of the ceramic tube with 0.5 $cm^3$ of rhodium nitrate solution, before drying and reducing as in Example 1. As a result, the ceramic tube contained 56 mg of rhodium.

Measurements

The membrane/methanation catalyst component was fitted into a module and tested as in Example 1. After the initial test, however, the membrane/methanation catalyst composite was subjected to 5 thermal cycles, before being re-tested.

Results

The initial gas permeation rate was 600 $cm^3$ $min^{-1}$. The exit stream was predominantly hydrogen, except for 139 ppm $CH_4$ and 8 ppm $CO_2$; no CO was detected.

After the 5 thermal cycles, the exit stream contained 430 ppm $CH_4$, indicating that substantial degradation of the membrane had occurred. However, the amount of carbon oxide that was able to pass through the rhodium catalyst without being methanated was very low. Only 0.6 ppm CO and 4 ppm $CO_2$ were detected.

Notable features of the present invention include those listed below.

1. The process and apparatus of the invention are particularly suitable for small scale operations (eg less than 600 liters/min of hydrogen-rich feed gas).

Examples of such small scale applications include (a) a system for supplying hydrogen or a hydrogen-rich gas to fuel cells and (b) supply of pure hydrogen for gas chromatography and other instruments.

If hydrogen was to be used say for an analytical instrument then the requirement would be for high purity and the flow rate would be very low (say one (1) liter/min or less). Furthermore, a typical flow rate for the hydrogen feed gas in a vehicular fuel cell application would be 180 $m^3$/hour.

2. The process and apparatus of the invention are also suitable for operation at comparatively low pressures, eg less than 40 bar on the feed side and a pressure drop typically of up to a few atmospheres. For example, in the analytical instrument example mentioned above, the pressure required to the instrument would probably be about 2 bar. In the case of fuel cells less than 5 bar pressure would be required.

3. The present invention is also suitable for both "static" and "portable" (mobile) applications. The former include phosphoric acid fuel cells and the latter includes low temperature low-temperature phosphoric acid fuel cells and proton exchange membrane fuel cells.

4. In small scale applications, the present invention allows for purification of the hydrogen feed stream in a single pass through the gas separation device although for large scale applications two or more purification stages may be required.

5. The present invention is also suitable for removing carbon dioxide from hydrogen-rich gas streams as well as the removal of carbon monoxide.

6. The apparatus and process of the present invention are also suitable for operation with the same absolute pressure but different partial pressures on either side of the membrane/catalyst composite.

7. A major advantage of the present invention is that it provides a gas separation device which negates pinhole leakages of carbon oxides through a hydrogen diffusion membrane by means of a combination of the membrane and methanation catalyst in the form of a composite. As a result, a lower specification can be set for the manufacture of the hydrogen diffusion membrane and also slight deterioration of a perfect membrane will not necessarily impact on the rest of the system. This is of particular importance with regard to palladium alloy membranes.

What is claimed is:

1. A gas separation device comprising a hydrogen diffusion membrane which is associated with an upstream surface of a porous or microporous support and a finely divided methanation catalyst for the removal of carbon oxides from hydrogen gas streams, said methanation catalyst being associated with a downstream surface of the support, wherein the hydrogen diffusion membrane, the support, and the methanation catalyst are in the form of a composite.

2. A gas separation device according to claim 1 wherein the support material is alumina or an alumino-silicate.

3. A gas separation device according to claim 1 wherein the hydrogen diffusion membrane is a palladium alloy membrane, a ceramic membrane, a zeolite membrane or a polymer membrane.

4. A gas separation device according to claim 3, wherein the palladium alloy membrane comprises palladium alloyed with one or more metals selected from the group consisting of Ag, Au, Pt, Cu, B, In, Pb, Sn and the rare earths.

5. A gas separation device according to claim 4, wherein the thickness of the palladium alloy membrane is from 1 to 10 microns.

6. A gas separation device according to claim 1 wherein the methanation catalyst is a selective methanation catalyst for the removal of carbon monoxide and/or carbon dioxide from a hydrogen gas stream.

7. A gas separation device according to claim 6 wherein the methanation catalyst is based on iron, cobalt, nickel, ruthenium, rhodium, palladium, osmium, iridium or platinum.

8. A process for the purification of a hydrogen gas stream using a gas separation device as claimed in claim 1.

9. A process according to claim 8 wherein the hydrogen gas stream to be purified is a reformate gas mixture.

10. A process according to claim 8 wherein the hydrogen gas stream is fed to the gas separation device at a pressure less than 30 atmospheres.

11. A process according to claim 8 wherein the pressure drop of the hydrogen gas stream over the gas separation device is less than 15 atmospheres.

12. A process according to claim 8 wherein the flow rate of the hydrogen gas stream fed to the gas separation device is less than 10,000 liters/min.

13. A process according to claim 8 wherein the hydrogen gas stream is purified in a single pass through the gas separation device.

14. A process according to claim 8 wherein the hydrogen diffusion membrane and the methanation catalyst of the gas separation device function within similar temperature ranges.

15. A fuel cell system for vehicular application comprising (a) an on-board hydrogen supply unit; (b) a hydrogen purification unit and (c) a fuel cell wherein the hydrogen purification unit operates by the process in accordance with claim 8.

16. A fuel cell system for vehicular application comprising (a) an on-board hydrogen supply unit; (b) a hydrogen purification unit and (c) a fuel cell wherein the hydrogen purification unit comprises a gas separation device as claimed in claim 1.

17. A fuel cell system according to claim 16 wherein the fuel cell is a proton exchange membrane fuel cell or a low-temperature phosphoric acid fuel cell.

* * * * *